United States Patent [19]

Kalogerson

[11] 4,004,273
[45] Jan. 18, 1977

[54] ENGINE SPEED RESPONSIVE ANTI-THEFT DEVICE FOR VEHICLE

[76] Inventor: Thomas A. Kalogerson, 4617 Terracewood Drive, Minneapolis, Minn. 55437

[22] Filed: Aug. 28, 1975

[21] Appl. No.: 608,572

[52] U.S. Cl. .................................. 340/64; 340/53; 340/62; 340/263; 307/10 AT; 180/114

[51] Int. Cl.² .......................................... G08B 13/22

[58] Field of Search ................. 340/62, 63, 64, 65, 340/53, 263; 307/10 AT; 180/105 E, 105 R, 106, 114

[56] References Cited

UNITED STATES PATENTS

| | | | |
|---|---|---|---|
| 3,203,501 | 8/1965 | Carter et al. | 340/53 X |
| 3,748,641 | 7/1973 | Hartung | 340/53 |
| 3,761,729 | 9/1973 | Engel | 180/105 E X |

Primary Examiner—Alvin H. Waring
Attorney, Agent, or Firm—Frederick E. Lange

[57] ABSTRACT

An anti-theft device for an automotive vehicle in which an electronic engine speed responsive means is effective, when said anti-theft device has been prepared for operation by closure of a concealed switch, to disable the engine after the engine reaches a predetermined speed and to maintain the engine disabled until the concealed switch is reopened. The device may also energize the horn relay so that the horn sounds while the engine is disabled. The electronic speed responsive device can be connected across the points and the circuit components all can operate at vehicle battery voltages so that the anti-theft device can be quickly installed in a vehicle. The engine disabling means can be maintained in operation either through the use of an electronic trigger switch or by the use of a relay which establishes its own holding circuit.

8 Claims, 3 Drawing Figures

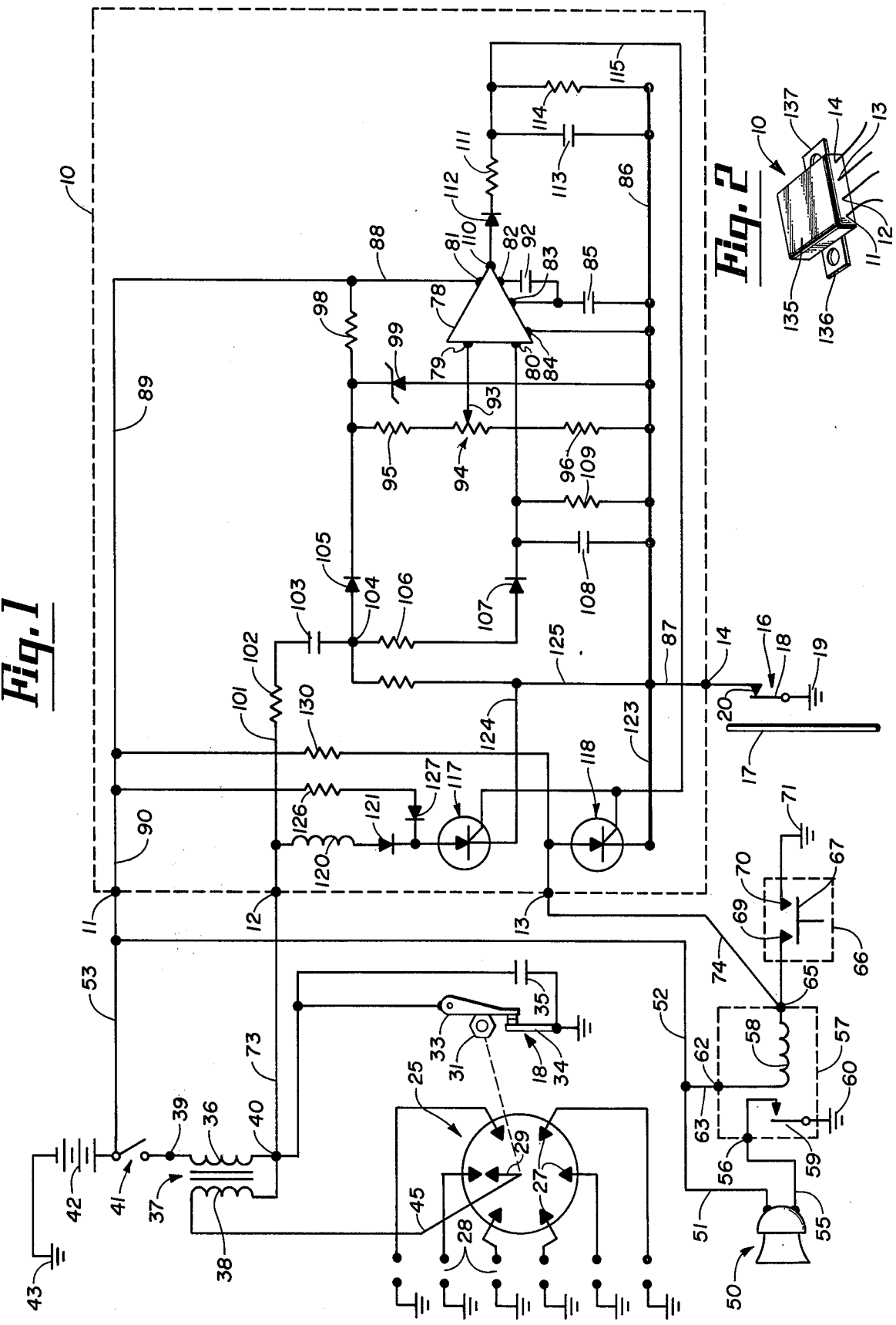

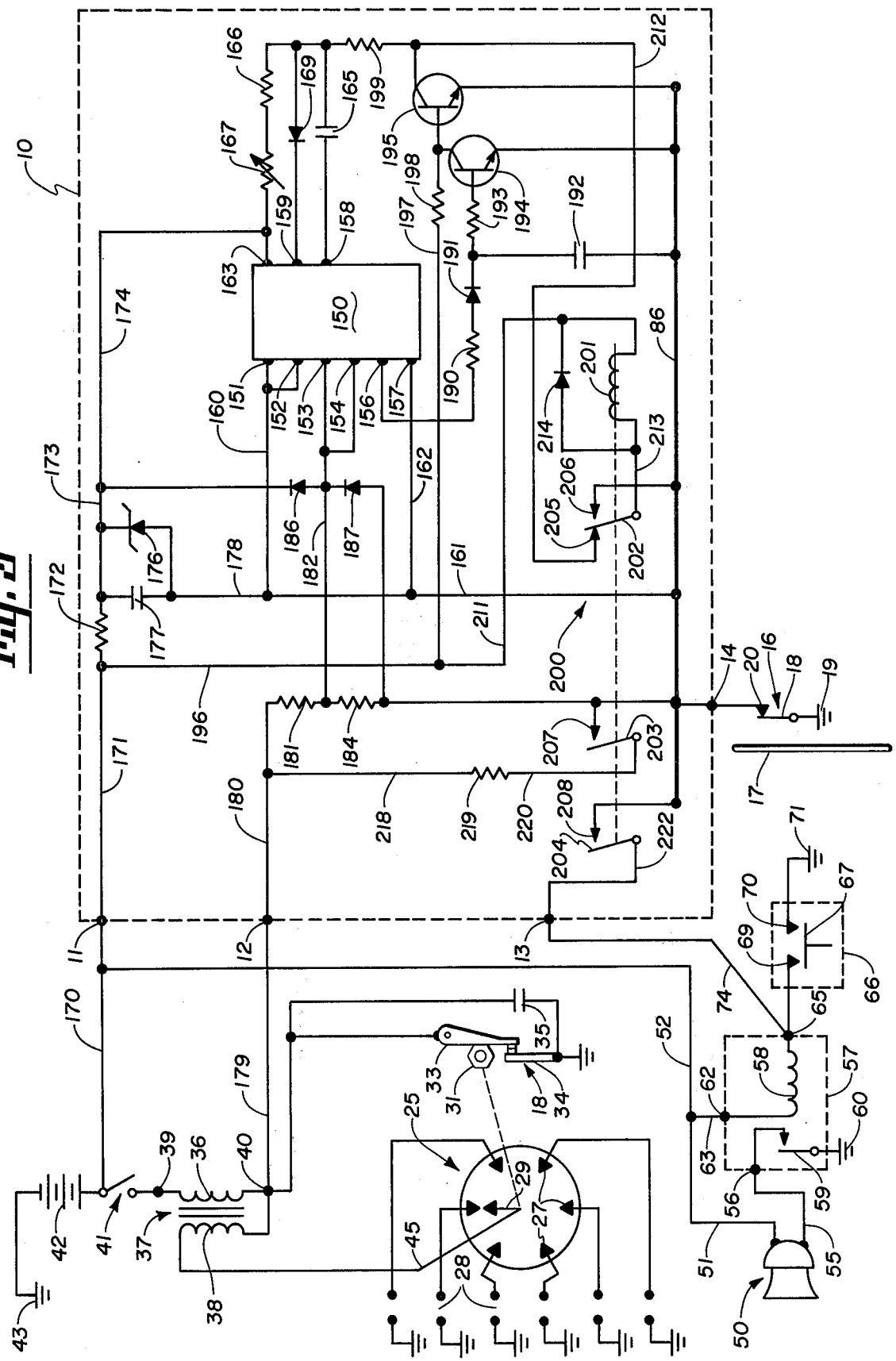

ENGINE SPEED RESPONSIVE ANTI-THEFT DEVICE FOR VEHICLE

BACKGROUND OF THE INVENTION

Numerous anti-theft devices have been developed for automotive vehicles. The majority of these are subject to any of various difficulties. In the first place, many are very complicated to install. In other cases, the anti-theft device is located so as to warn the thief that the car is equipped with some device. Or, the anti-theft device may prevent the vehicle from being started or driven from its parked position, again alerting the thief that the car is equipped with some anti-theft device. Where the thief is alerted to the fact that there is such an anti-theft device in the car, he is very apt to disarm the device or cause damage to the vehicle in his frustration to complete his intended theft. Where the automotive vehicles are left in remote or unattended areas, the thief has ample time to tamper with any anti-theft device or even strip the car if he is unsuccessful in starting it and driving away.

As a result, consideration has been given to anti-theft devices which allow the car to be started and which subsequently disable it. In some cases, this is done by a timing device which results in the engine being disabled a predetermined time after it is started unless some step has been taken to prevent the operation of this disabling device. In some cases, the tires have been allowed to deflate if the engine is driven by an unauthorized person. In another instance, the fuel to the engine is shut off so that after a vehicle is driven a short distance, it stops.

While all of these devices which have just been described do have the advantage that they permit the car to be started by the thief and then stop the car after it has been driven for a while, they do have various disadvantages. In some cases, such as allowing the tires to become deflated, there can be definite damage done to the car by the thief in attempting to continue to drive the car after the tires have become deflated. In other cases, the device is difficult to install or cannot be readily tested to determine whether it is operating properly.

SUMMARY OF THE PRESENT INVENTION

The present invention is concerned with an anti-theft device of the type in which the vehicle is stopped after being driven for a while and in which the engine disabling means is operated under the control of a speed responsive means responsive to the speed of the engine so that the disabling means is placed in operation whenever the speed of the engine exceeds a predetermined value. Furthermore, once the disabling means has been rendered effective, it is maintained effective until a manually operable means, not readily accessible to someone unfamiliar with the car, is actuated to disable the anti-theft device.

My present invention has the advantage of being very compact and of being readily installed in an existing automotive vehicle with a minimum of modification thereof. The device uses electrical components, all of which are energizable by the ordinary battery of the vehicle so that no external source of power is required.

The anti-theft device may also operate the horn of the vehicle so that when the engine is stopped, the horn is placed in operation to further disconcert the thief and cause him to abandon the vehicle.

In this device of the present invention, the anti-theft device can be disabled by a switch mounted in an inconspicuous location in the driver's compartment of the vehicle. Unless this switch is moved to a position where the anti-theft device is ineffective, the anti-theft device is automatically placed in operation when the vehicle is started.

The speed responsive means of the anti-theft device of this invention may be an electronic speed sensing apparatus connected across the points of the ignition system or to the ignition system in such a manner that the speed responsive device responds to ignition pulses. In this way, the speed responsive means can be relatively simple and need have no separate speed sensing apparatus associated therewith.

The disabling means of the present anti-theft device can establish a short circuit condition across the points or other portion of the ignition system so as to prevent the ignition system from being effective when the disabling means is operated.

Other features and objects of the present invention will be apparent from a consideration of the accompanying specification, claims and drawing.

BRIEF DESCRIPTION OF THE DRAWING

FIG. 1 is a schematic view of my improved anti-theft device applied to an automotive vehicle, the ignition system and horn of which are shown schematically;

FIG. 2 is a perspective view of the housing for the main portion of my anti-theft device showing the compact manner in which the equipment is housed; and FIG. 3 is a view similar to FIG. 1 but employing a modified electronic circuit and employing a relay instead of an electronic switch.

DESCRIPTION OF THE PREFERRED EMBODIMENT

Referring to FIG. 1, the reference numeral 10 is employed to indicate the primary portion of my improved anti-theft device. The equipment is shown schematically and is outlined in dotted lines. It will be noted that the equipment has four terminals 11, 12, 13 and 14 from which electrical conductors extend as shown in FIG. 2.

The terminal 14 is connected to a switch 16 which is preferably located in the driver's compartment behind a dash panel 17 where it is out of sight and will not be readily discoverable by anyone unfamiliar with the location of the switch. The switch 16 comprises a switch blade 18 connected to ground at 19 and engageable with a contact 20. The switch 16 is preferably a manually operable switch of any suitable type such as a precision snap switch. The terminals 11, 12, and 13 are connected to various elements of the automotive vehicle.

Numeral 25 is employed to designate the usual distributor having a plurality of contacts 27, each of which is connected to one of a series of igniters 28 which normally take the form of spark plugs. Cooperating with the fixed contacts 27 is a rotating distributor arm 29 which is driven by the engine to successfully make electrical contact with the various fixed contacts 27 and successively connect the output of the distributor with the various igniters 28 in the desired sequence. Driven by the same shaft as the distributor rotor 29 is a cam 31 which cooperates with the "points" 18 formed by two switch blades 33 and 34. Switch blade 34 is grounded and stationary while switch blade 33 cooperates with the cam 31 which is effective to periodically move switch blade 33 away from switch blade 34 to "open" the points. The usual capacitor 35 is connected across the points. The number of fixed contacts 27 will correspond with the number of cylinders in the engine and hence the number of igniters employed. I have illustratively shown the engine as a six cylinder engine. Similarly, the cam 31 will have a number of lobes equal to the number of cylinders and the number of igniters.

The points 18, in the usual manner, control the flow of current through the primary winding 36 of an ignition transformer 37 having a relatively high voltage secondary 38. The primary winding 36 is provided with two electrical terminals 39 and 40. The terminal 39 is connected through the usual key operated ignition switch 41 to the ungrounded terminal of the usual automobile battery 42, the opposite terminal of which is connected to ground at 43. The lower terminal 40 of primary winding 36 is connected to the movable switch blade 33 of the points 18. The lower terminal of the high voltage secondary 38 is connected to terminal 40 and thus when the points are closed, to ground. The opposite terminal is connected through a conductor 45 to the distributor arm 29. Thus, as the points are opened and closed, the flow of current through the primary winding is interrupted to produce a high voltage in the secondary winding 38. The high voltage produced in secondary winding 38 is successively applied to the distributor points and hence to the respective igniters 28 as the distributor arm 29 rotates.

The automobile is also equipped with a horn which is designated by the reference numeral 50. This horn, as is conventional, has a positive terminal and a ground terminal. The positive terminal is connected through conductors 51, 52 and 53 to the positive terminal of battery 42. The ground terminal is connected through conductor 55 to a horn terminal 56 of a horn relay 57. The horn relay 57 comprises a relay coil 58 which actuates a normally open switch blade 59 connected to ground at 60. The switch blade 59 is designed when the coil 58 is energized to engage a fixed contact connected with the horn terminal 56 of the horn relay to complete a circuit from the ground terminal of the horn to ground. The relay coil 58 is connected to a terminal 62 which is connected through conductors 63, 52 and 53 to the positive terminal of the battery 42. The opposite terminal of the relay 58 is connected to a horn switch terminal 65 which in turn is connected to a horn switch 66, usually mounted on or adjacent the steering wheel. The horn switch 66 comprises a switch blade 67 normally biased out of engagement with but manually movable into engagement with two fixed contacts 69 and 70. Contact 70 is connected to ground at 71. Contact 69 is connected to the horn switch terminal 65 of the horn switch relay 57.

As will be presently described, the anti-theft device of the present invention is intended to establish a substantial short circuit around the points 18 and to energize the horn relay 57, independently of the horn switch 66, whenever the engine speed reaches a predetermined value and the switch 16 is closed.

Turning now to the details of the unit 10, the unit includes an amplifier 78. This amplifier is a conventional high performance operational amplifier of the type commercially sold as a μA741 operational amplifier. The amplifier is shown as comprising an inverting input terminal 79, a non-inverting input 80, a power supply terminal 81, offset null terminals 82 and 83, and a ground terminal 84. The offset null terminal 83 is connected through a capacitor 85 to a line 86 which is normally at ground potential when the equipment is in operation. This ground conductor 86 which is shown in slightly heavier lines is connected through a conductor 84, the terminal 14, and switch 16 to ground at 19. As previously explained, switch 16 is closed whenever it is desired to have the anti-theft device operative. Thus, in the subsequent discussion, it will be assumed that the conductor 86 is a ground potential.

Connected between the offset null terminals 82 and 83 is a small capacitor 92. The function of this capacitor and capacitor 85 is to stabilize the operation of the amplifier to prevent any oscillatory conditions. The power supply terminal 81 is connected through conductors 88, 89 and 90 and 53 to the positive terminal of the car battery 42.

The inverting input terminal 79 of amplifier 78 is connected to a slider 93 of a potentiometer 94 which is connected in series with two other resistors 95 and 96 to form a voltage divider. The lower terminal of resistor 96 is connected to the ground conductor 86 while the upper terminal of resistor 95 is connected through a resistor 98 and conductors 89, 90 and 53 to the positive terminal of battery 42. Connected in parallel with the voltage divider resistors 94, 95 and 96 is a Zener diode 99 which insures that a constant voltage is maintained across the voltage divider resistors. Thus, the slider 93 connected to the inverting input 79 is maintained at a constant voltage with respect to ground regardless of variations in the voltage of the car battery.

The basic control signal for controlling amplifier 78 is derived from the voltage across the points 18. As previously pointed out, the switch blade 34 of the points is grounded. The other switch blade 33 is connected to the lower terminal 40 of primary 36. The terminal 40 is connected through conductors 73, input terminal 12, conductor 101, resistor 102, and d.c. blocking condenser 103 to a junction 104. Thus, the voltage across the points appears between junction 104 and ground. This voltage is clipped by the Zener diode 99 since it is obvious that whenever the voltage exceeds a predetermined magnitude, a shunt is provided by diode 105 and Zener diode 99. Thus, the voltage appearing at junction 104 is in the form of a series of positive pulses of relatively constant magnitude, this magnitude being determined by the Zener breakdown voltage. This voltage is applied through resistor 106 and a diode 107 to the positive terminal of a capacitor 108. Capacitor 108 is shunted by a relatively high impedance resistor 109. It will be obvious that each time that the points open, a voltage pulse of predetermined magnitude is applied through the circuits just traced to the positive terminal of capacitor 108 to charge the same. This pulse continues for the entire time that the points are open. When the points close, the capacitor 108 tends to discharge through the resistor 109. Inasmuch as the voltage pulses are of constant magnitude due to the effect of the Zener diode, the charging effect upon capacitor 108 will be dependent upon the frequency with which the points open and close. In other words, the faster the points open and reclose, the less chance there will be for the capacitor 108 to discharge to resistor 109. Thus, as the engine speed increases to a predetermined value, this voltage as applied to input terminal 80 from across capacitor 108 will bear such a relation to the voltage applied to the inverting input terminal 79 that the amplifier 78 will become conductive and produce an output at the output terminal 110 thereof. The speed at which this happens is dependent upon the voltage applied to input terminal 79 which is, in turn, dependent upon the position of the slider of potentiometer 94. Thus, potentiometer 94 provides a means for adjusting the speed response of the device.

This output terminal 110 is connected through a diode 112 and a resistor 111 across a capacitor 113 which functions to smooth the output of the amplifier. Connected in parallel with the capacitor 113 is a resistor 114. The voltage at the upper terminal of capacitor 113 and resistor 114 is applied through a conductor 115 to the gates of two silicon control rectifiers 117 and 118. The silicon control rectifier 117 is effective, as will be described later, to short circuit the points 118 when it becomes conductive. The silicon controlled rectifier 188 is effective when it becomes conductive to establish a circuit to the horn relay independently of the horn switch 66.

Referring now to silicon control rectifier 117 (which will be referred to as SCR 117), the terminal 12 of the anti-theft device, which as previously pointed out is connected through the lower terminal 40 of the primary winding to points 18, is connected through an inductance 120 and a diode 121 to the anode of the SCR 117. The cathode of this SCR is connected through conductors 124 and 125 to the ground conductor 186. Thus, as will be clear, when the SCR 117 is turned on by reason of having a gate voltage applied thereto, a circuit is established from the ungrounded terminal of the points 18 through the inductance 120, the diode 121, and the SCR 117 to ground. The purpose of the inductance 120, which is a relatively small inductance, is to slow down the establishment of the circuit around the points 18 and to minimize the effect of any voltage spikes that might occur. There is also a connection from the positive side of the car battery 42 to the anode of SCR 117 leading through conductors 53 and 90, resistor 126 and diode 127 to the anode. The purpose of this is to maintain a voltage on the anode after the points 18 have been short circuited to maintain the SCR 117 conductive. It is important, as has been emphasized, that SCR 117 continue to conduct once it has broken down. An SCR will inherently continue to conduct as long as anode voltage is applied thereto. Thus, the connection through resistor 126 insures the continued conductivity of the SCR 117, once it has been rendered conductive by the application of a gate voltage thereto.

Referring now to the SCR 118, it will be noted that the anode is connected to the terminal 113 which, as previously explained, is connected through a conductor 74 to the horn switch terminal 65 of the horn relay 57. The cathode is connected through conductor 123 to the ground terminal 86, thus when the SCR 118 is "turned on" a path from the horn switch terminal 65 to ground is established in parallel with the horn switch 66 so that the horn will be turned on even though the horn switch 66 is open. Again, voltage is supplied to the anode of SCR 118 from the battery through a connection including a resistor 130 so that the continued conductivity of the SCR 118 is assured.

Referring now to the operation of the equipment described so far, let it be assumed that the vehicle is left by the operator with the switch 16 closed so that the anti-theft device of the present invention is operative. Under these conditions, the vehicle can be started in the usual manner by closure of switch 41 and starting the motor in the conventional manner. There is nothing in the operation so far to in any way alert the thief that the vehicle is provided with any special equipment. As the car is driven the engine will pick up in speed. At a certain speed, determined by the setting of the slider of potentiometer 94, the voltage developed across capacitor 108 will become sufficiently large to cause an output to appear at output terminal 110 of amplifier 78. This output will be applied through conductor 115 to the gates of SCRs 117 and 118 to cause these devices to become conductive. As previously explained, the effect of the conductivity of SCR 117 is to place a substantial short circuit across the points 18 thereby rendering the engine ineffective since an igniting voltage is no longer supplied to the igniters 28. The result is that the car coasts to a complete halt. At the same time, SCR 118 is rendered conductive and, as just explained above, this causes a circuit to be established in parallel with the horn switch 66 to energize the horn relay 58 to pull in the switch blade 59 of the horn relay and establish a circuit from the ground terminal of horn 50 to ground. This will result in the horn sounding. The thief is now confronted with the fact that not only has the engine stopped but the horn is now sounding continuously without interruption. Under these circumstances, the thief will probably abandon the car quickly and try to leave the vicinity. The attention of bystanders will naturally be attracted to a stalled car with the horn sounding and the police will undoubtedly be called. The result is that the car can be returned to the owner with practically no damage thereto.

One of the very important advantages of the present invention is that the device can be installed with almost no difficulty whatsoever. As will be noted from FIG. 2, the device is relatively compact. The operational amplifier 78, the SCRs 117 and 118, and the various components described above can all be assembled in a relatively compact housing. In FIG. 2, this housing is shown as the housing 135 having ears 136 and 137 for the reception of sheet metal screws or other fastening means for quickly fastening the device to a suitable point underneath the hood of the car. The leads from terminals 11, 12 and 13 can be quickly secured to already existing terminals on the car. The terminal 11 can be simply connected to any point having the same potential as the positive terminal of the battery. It is important that terminal 11 be connected to a point that is not switched by the ignition switch 41 but remains permanently at the battery potential.

The terminal 12 can, as previously pointed out, be connected to the distributor terminal of the primary winding or to the wire leading from the primary winding to the distributor. The terminal 13 will be connected to the horn switch terminal of the horn relay. The switch 16 is mounted on any suitable point near the dashboard where the switch can be easily reached by the owner but concealed from view. The switch may be mounted or taped to existing brackets or wire harness, depending upon the choice of location. The ground terminal of the switch can be connected at any suitable point. As previously pointed out, the switch may be a precision snap switch. The wire leading from the switch 16 to terminal 14 will be run through any convenient hole in the fire wall so that the lead from switch 16 will enter the engine compartment. The effect is that the unit can be very quickly installed in an automobile and will be completely out of sight so that a thief will not notice the presence of any special equipment designed to guard against theft. The only movable part in the entire equipment is the switch 16, which can be a relatively simple switch which can be readily mounted in the manner described above.

In referring to the apparatus for turning on the horn independently of the horn switch 66, it is to be understood that this is an optional feature and that it is not essential to the apparatus. In some cases, it may be desirable to rely entirely upon the apparatus stopping the engine and not providing for turning on the horn when this happens.

MODIFICATION OF FIG. 3

The device of FIG. 3 is similar to that of FIG. 2. The two basic differences between the apparatus of FIG. 3 and that of FIG. 1 is that the apparatus of FIG. 3 employs an electromechanical relay instead of silicon controlled rectifiers nnd employs a somewhat different electronic circuit for energizing this relay. In FIG. 3, all of the elements of the automobile have been given the same numbers, as has been the switch which mounts behind the dashboard 17. Like the unit 10 of FIG. 1, the unit 10 of this figure also has four terminals 11, 12, 13 and 14. Just as with FIG. 1, terminal 11 is connected to the positive side of the car battery 42, terminal 12 is connected to the ungrounded terminal of the points 18, terminal 13 is connected to the horn switch terminal of the horn relay 57, and terminal 14 is connected to the concealed switch 16.

In the version of FIG. 3, however, the electronic circuit is somewhat different. Referring specifically to the drawing, there is an amplifier 150 which functions as a retriggerable one shot multivibrator. Such an amplifier is commonly designated as a 9601 integrated circuit. It is also known as the AT22 Signetics retriggerable one shot amplifier. Such a unit has the function of producing, when an input signal is applied thereto, an output pulse having a duration dependent upon the values of external timing components connected thereto. The amplifier 150 is shown as having terminals 151 through 154 corresponding to terminals 1 through 4 of a conventional 9601 integrated amplifier. Terminals 151 and 152 are connected together and to ground through conductors 160 and 161 leading to the ground conductor 86 which corresponds to the ground conductor of FIG. 1 previously described. The terminals 153 and 154 are input terminals and are connected together and to a source of input signal as will be presently described. The amplifier also has terminals 156 and 157 which correspond to the conventional terminals 6 and 7 of a conventional 9601 amplifier. Terminal 156 is the inverting output terminal of the amplfier whereas terminal 157 is the non-inverting output terminal, this terminal being connected to ground through conductors 162 and 161 which lead to the ground conductor 86. Terminals 158, 159 and 163 correspond to terminals 11, 13 and 14 respectively of a 9601 amplifier and the components connected therebetween determine the length of the pulse of the output terminal 156 of the amplifier. Connected between terminals 158 and 163 are a capacitor 165, a fixed resistor 166 and a rheostat 167. The setting of rheostat 167 determines the time constant of this circuit and hence determines the width of the pulses constituting the output of the multivibrator. A diode 169 is connected between terminal 158 and the junction of resistor 166 and capacitor 165.

Power is supplied to the amplifier 150 from the car battery 42 through a connection including conductors 170 and 171, resistor 172 and conductors 173 and 174 to the power input terminal 163. The voltage applied to terminal 163 is maintained constant by a Zener diode 176 connected between the right hand terminal of resistor 172 and the ground conductor 86 through conductors 178 and 161. A capacitor 177 is connected in parallel with the Zener diode 176 to eliminate any possible fluctuations in the voltage. The result is that a very constant voltage is applied to the power supply terminal 163 of amplifier 150.

The voltage across the points 18 is applied to the input terminals 153 and 154 through a circuit including a conductor 179, terminal 12, conductor 180, resistor 181, and conductor 182 to the input terminals 153 and 154. The resistor 181 forms part of a voltage divider circuit including a further resistor 184 which has its lower terminal connected to the grounded conductor 86. Thus, a portion of the voltage across the points dependent upon the relative magnitudes of resistors 181 and 184 is applied to the input terminals 153 and 154. In practice, the resistance value of resistor 184 is very small compared with that of resistor 181 so that only a small portion of the voltage across the points is applied to input terminals 153 and 154. A diode 186 is connected between conductor 182 and the upper terminal of Zener diode 176. The purpose of this connection is to clip the voltage across points 18. In other words, the portion of the voltage above the breakdown voltage of the Zener diode will be bypassed through diode 186 and Zener diode 176. Thus, it is assured that the pulses being applied to terminals 153 and 154 will be of a relatively constant magnitude corresponding to the breakdown voltage of the Zener diode 176. A further diode 187 is connected between conductor 182 and the ground conductor 186. The purpose of this is to bypass any negative component that might appear in the voltage appearing across points 18. Thus, only positive pulses of a predetermined magnitude are fed to the input terminals 153 and 154.

Turning now to the voltage appearing at the output terminal 156, output terminal 156 is, previously noted, the inverting output terminal. Thus the pulses that appear at this terminal are negative pulses which correspond in frequency to the pulses appearing across points 18 and hence the the speed of the engine. The width of these pulses, as previously pointed out, is detemined by the setting of rheostat 167. These pulses are applied through a resistor 190 and a diode 191 to a capacitor 192 the upper terminal of which is connected through a resistor 193 to the base of an NPN transistor 194. When there is no output at terminal 156, the base potential is sufficiently high with respect to the emitter that current flows through the collector emitter circuit of transistor 194. It will be noted that the collector is connected to the positive side of the battery 141 through conductors 170, 171, 196 and 197 and resistor 198. At the same time, the emitter is connected to the ground conductor 86. Thus, a current path exists through the emitter-collector path and the transistor 194 is turned on as long as the base potential remains sufficiently high. This, in turn, lowers the impedance between the base and emitter of a further transistor 195 to tend to maintain the base of transistor 195 close to the potential of ground conductor 86 and hence to keep transistor 195 turned off. As the negative pulses from output terminal 156 increase in frequency due to the engine running at a faster speed, the effect of the negative pulses is to lower the potential of the upper terminal of capacitor 192 and hence lower the base potential. The result is that the base potential at a predetermined speed is lowered sufficiently to turn off transistor 194. When this happens, the transistor 195 is turned on since the potential of the base is suddenly raised very high with respect to the emitter. The collector is connected to the positive sources of power supply through rheostat 167, resistor 166 and a resistor 199. It will be noted that the emitter of transistor 195 is connected to the ground conductor 86.

The transistor 195 is used to control the energization of a relay generally indicated by the reference numeral 200. The relay 200 comprises a relay coil 201 which is associated with an armature which, in turn, is designed to actuate three switch blades 202, 203 and 204. Switch blade 202 is normally biased into engagement with a fixed contact and is movable into engagement, upon energization of coil 201, with a second fixed contact 206. Preferably, the contacts 205 and 206 are of the overlapping type so that switch blade 202 moves into engagement with contact 206 before separating from contact 205. Switch blade 203 is normally biased out of engagement with a fixed contact 207 and is moved into engagement therewith upon energization of relay coil 201. Similarly, switch blade 204 is normally biased out of engagement with a fixed contact 208 but is movable into engagement therewith upon energization of coil 201.

The relay coil 201 has one terminal thereof connected to the battery 42 by conductors 170, 171, 196 and 211. The opposite terminal of the relay coil is connected by a conductor 213 to the switch blade 202. When the transistor 195 becomes conductive, a circuit is established from the ground terminal of relay 201 through this conductor 213, switch blade 202, contact 205, a conductor 212, and the collector-emitter path of transistor 195 to the ground conductor 86. As previously explained, the opposite terminal of coil 201 is connected to the positive side of battery 42. Thus, as soon as transistor 195 becomes conductive, a circuit is established through the relay coil 201. A diode 214 is connected across the relay to bypass any transient negative voltages that might be introduced and would disturb the operation of the relay coil.

The energization of relay coil 201 will result in switch blade 202 moving into engagement with contact 206 and out of engagement with contact 205. Similarly, switch blades 203 and 204 will be moved into engagement with contacts 207 and 208, respectively. The engagement of switch blade 202 with contact 206 will result in a holding circuit being established for relay coil 201 which is independent of the transistor 195. This holding circuit is through the conductors traced from the positive terminal of battery 42 through the relay coil, conductor 213, switch blade 206 and contact 20 which is directly connected to the ground conductor 86. Thus, as long as the switch 16, behind the dash panel 17, is closed to connect the ground conductor 86 to ground, the relay 201 will remain energized.

The engagement of switch blade 203 with contact 207 will establish a substantial short circuit across the points 18. This circuit may be traced from terminal 40 which is connected to switch blade 33 of the points 18 through conductors 179, 180 and 218, resistor 219, conductor 220, switch blade 203 and switch contact 207 which is connected to the ground conductor 86. Thus, except for the relatively small resistor 219, the points will be short circuited by the closure of relay 200 just as in the case of FIG. 1 in which the SCR 117 established a substantial short circuit across the points 118 when the SCR 117 is turned on.

The engagement of relay switch blade 204 with contact 208 results in a circuit being established around the horn switch as follows: from the horn switch terminal 65 of the horn relay 57 through conductor 74, terminal 13, conductor 222, switch blade 204 and switch contact 208 which is connected to the ground conductor 86. Thus, a circuit will be established in parallel with the horn switch 66 and will energize the horn relay to in turn turn on the horn 50.

It will be seen that just as with the species of FIG. 1, a circuit is established to substantially short circuit the points 18 when the engine speed reaches a predetermined value. This is done in this particular species by reason of the energization of relay coil of a relay 200. It will furthermore be seen that with this species, when the relay coil 200 is energized, a holding circuit is established for the relay coil which is independent of the speed responsive mechanism so that the relay remains energized continuously, once it has been energized. The energization of this relay results not only in a substantial short circuit being established around the points 18 thereby causing the engine to stop operation but also, if desired, establishes a circuit to the horn relay to cause the horn to sound continuously. In either the apparatus of FIG. 1 or FIG. 3, the engine remains disabled until someone opens the switch 16 which, as previously pointed out, is not readily visible in the driver's compartment. Thus, as with the species of FIG. 1, the thief is apt to abandon the car and the stalled car with the horn blowing will call the attention of bystanders to the fact that something is wrong.

CONCLUSION

It will be seen that I have provided a new and novel auto theft device which does not forewarn the thief of the fact that the automotive vehicle is equipped with an anti-theft device. The device, moreover, permits the thief to drive the automobile for a short distance, presumably into a public street, before the automobile is rendered ineffective. Furthermore, where desired, a horn may sound when the predetermined speed has been reached.

While I have shown certain specific embodiments of my invention, it is to be understood that this is for purposes of illustration only and that the scope of the invention is limited solely by the scope of the appended claims.

I claim as my invention:

1. An anti-theft device for a vehicle driven by an internal combustion engine having an ignition system including a plurality of igniters, a transformer having a secondary selectively connected to said igniters for energizing the same, and switching means driven by said engine for periodically interrupting the current flowing through the primary of said transformer, said device comprising:

disabling means for connection to an internal combustion engine for disabling the engine,
   speed responsive means responsive to the speed of the engine and comprising an electronic speed sensing means adapted to be connected across such a switching means and generate a voltage dependent upon the speed with which said switching means is actuated and means responsive to said voltage connected to said disabling means and effective when said voltage exceeds a value indicative of the predetermined value of engine speed to actuate said disabling means regardless of the speed of the vehicle, manually operable means for rendering said disabling means ineffective when the vehicle is to be driven by an authorized driver, and means for maintaining said disabling means effective after actuation thereof until said manually operable means is operated, regardless of the time intervening until said manually operable means is operated.

2. The anti-theft device of claim 1 in which the vehicle is equipped with an electrically controlled horn and in which the disabling means is effective to initiate operation of the horn whenever said disabling means is placed in operation and to maintain said horn in operation as long as said disabling means is effective.

3. The anti-theft device of claim 1 in which the manually operable means for rendering the disabling means ineffective is a switch for mounting in an inconspicuous location in the drivers compartment of the vehicle.

4. The anti-theft device of claim 1 in which the various components of the electronic speed sensing means are designed for operation with voltages no greater than that of a conventional battery employed in the vehicle.

5. The anti-theft device of claim 1 in which the disabling means comprises an electronic switch which tends to remain conductive after having been placed in a conductive state and in which the means for maintaining the disabling means effective comprises means for maintaining said electronic switch conductive.

6. The anti-theft device of claim 1 in which the disabling means comprises a relay connected to said speed responsive means and energized whenever the speed exceeds said predetermined value and in which means for maintaining said disabling means effective after actuation thereof is a holding circuit for maintaining said relay energized independently of said speed responsive means.

7. The anti-theft device of claim 1 in which the manually operable means for rendering the disabling means ineffective is a normally closed switch connected in circuit with the power supply for the electronic speed sensing means.

8. The anti-theft device of claim 7 in which the switch is connected between the speed sensing means and a ground connection.

* * * * *